No. 747,271. Patented December 15, 1903.

UNITED STATES PATENT OFFICE.

JOSEPH TCHERNIAC, OF FREIBURG IN BREISGAU, GERMANY.

PROCESS OF MANUFACTURING HYDROCYANIC ACID AND CYANIDS.

SPECIFICATION forming part of Letters Patent No. 747,271, dated December 15, 1903.

Application filed March 16, 1903. Serial No. 148,096. (No specimens.)

*To all whom it may concern:*

Be it known that I, JOSEPH TCHERNIAC, analytical chemist, a citizen of France, residing at Freiburg in Breisgau, Germany, have invented a certain new and useful Process of Manufacturing Hydrocyanic Acid and Cyanids, (for which I have made application for a patent in Great Britain, No. 17,976, dated August 15, 1902,) of which the following is a specification.

This invention relates to the manufacture of hydrocyanic acid by oxidizing a sulfocyanid by oxygen or air in presence of nitric acid and to the manufacture of cyanids by absorbing the hydrocyanic-acid vapor thus evolved by a suitable base or carbonate. For this purpose a solution of a sulfocyanid is mixed with nitric acid and a current of air or oxygen is passed through the heated mixture. The gases and vapors issuing from the vessel are passed over or through a suitable absorbent of hydrocyanic acid, such as a base or a carbonate, either dry and heated or in solution or suspension in water or in a fused state.

A small quantity of dilute nitric acid is put into an oxidizing vessel of suitable material and heated to about 100° centigrade. The sulfocyanid solution is allowed to flow in slowly at the same time that a current of air is passed through the mixture. The proportion of air to the sulfocyanid solution is so regulated that rather more oxygen is let in than is required by the equation

$$HSCN + O_3 = HCN + SO_3.$$

If the vessel in which this oxidation occurs is large enough, the nitric acid is almost entirely regenerated in the vessel itself. The gases evolved are led through a tower or similar apparatus, in which they meet with a slow stream of dilute nitric acid flowing in the opposite direction, which removes the last traces of nitric oxid.

When the apparatus is in working order, a little nitric acid has to be run into the oxidizing vessel to replace inevitable loss. The quantity required is, however, very small. The residual liquor in the oxidizing vessel passes through an overflow-pipe into a second vessel, in which it comes into contact with the stream of air flowing in the opposite direction. By this means the last traces of hydrocyanic acid and nitric oxid are volatilized and carried back into the oxidizing vessel. The gases which pass over from the oxidizing vessel and consist of nitrogen and hydrocyanic acid, together with the excess of oxygen, steam, and a little nitric acid, and carbonic acid, are freed from the nitric acid by suitable means—such, for example, as by passing them over anhydrous sodium sulfate or alumina dried—and then in order to obtain cyanid are led over heated sodium carbonate.

When using sodium carbonate for absorbing the hydrocyanic acid, for example, the best results are obtained if the temperature is maintained at about 450° centigrade and the hydrocyanic gases are passed over the dry carbonate until the conversion into cyanid is complete. In this way there is obtained a sodium cyanid of ninety-eight per cent. strength as a fine powder, which dissolves almost instantaneously in water and can be readily fused when desired. It is almost free from cyanate.

If potassium carbonate is used instead of sodium carbonate, a somewhat lower temperature may be employed, while calcium carbonate at a higher temperature yields chiefly calcium cyanid.

Having thus described the nature of this invention and the best means I know of carrying the same into practical effect, I claim—

1. The process of manufacturing hydrocyanic acid, which consists in subjecting a mixture of a sulfocyanid and nitric acid to the action of oxygen.

2. The process of manufacturing hydrocyanic acid, which consists in subjecting a heated mixture of a sulfocyanid and nitric acid to the action of oxygen.

3. The process of manufacturing cyanid which consists in subjecting a heated mixture of a sulfocyanid and nitric acid to the action of oxygen, and passing the gases evolved over a heated base.

4. The process of manufacturing a cyanid which consists in subjecting a heated mixture of a sulfocyanid and nitric acid to the action of oxygen, and passing the gases evolved over a heated carbonate.

5. The process of manufacturing a cyanid which consists in subjecting a heated mixture of a sulfocyanid and nitric acid to the action of oxygen, and then passing the gases evolved over sodium carbonate heated to 450° centigrade.

In testimony whereof I have hereunto set my hand in presence of two subscribing witnesses.

JOSEPH TCHERNIAC.

Witnesses:
   A. BRAUN,
   H. ALBICKER.